(12) United States Patent
Katsuta et al.

(10) Patent No.: US 7,357,962 B2
(45) Date of Patent: Apr. 15, 2008

(54) AUTOMOBILE BODY-USED LIGHT-COLORED WATER BASED COATING COMPOSITION

(75) Inventors: Hideaki Katsuta, Kanagawa-ken (JP); Shingo Sato, Kanagawa-ken (JP); Yoshizumi Matsuno, Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/963,717

(22) Filed: Oct. 14, 2004

(65) Prior Publication Data

US 2005/0082169 A1 Apr. 21, 2005

(30) Foreign Application Priority Data

Oct. 15, 2003 (JP) ............................. 2003-355457
Oct. 7, 2004 (JP) ............................. 2004-295016

(51) Int. Cl.
*B05D 3/02* (2006.01)
*C08J 3/05* (2006.01)

(52) U.S. Cl. .................. 427/409; 427/407.1; 523/201; 524/451; 524/501; 524/505; 524/507; 524/513; 525/124

(58) Field of Classification Search .............. 524/501, 524/502, 505, 507, 513; 523/201; 427/409
See application file for complete search history.

(56) References Cited

U.S. PATENT DOCUMENTS

| 3,970,771 | A | | 7/1976 | Davison |
| 5,352,755 | A | * | 10/1994 | Hughes et al. ................. 528/45 |
| 6,451,901 | B1 | * | 9/2002 | Maekawa et al. ............. 524/505 |
| 6,552,131 | B1 | | 4/2003 | Higuchi et al. |
| 6,610,774 | B2 | * | 8/2003 | Maekawa et al. ............ 524/500 |
| 6,737,468 | B1 | * | 5/2004 | Bremser ....................... 524/547 |
| 6,774,173 | B2 | * | 8/2004 | Kato et al. ................... 524/513 |
| 6,914,116 | B2 | * | 7/2005 | Katsuta et al. .................. 528/45 |
| 2002/0040098 | A1 | | 4/2002 | Maekawa et al. |
| 2003/0053782 | A1 | | 3/2003 | Fabian et al. |
| 2003/0125460 | A1 | * | 7/2003 | Kato et al. ...................... 525/30 |
| 2004/0087713 | A1 | | 5/2004 | Fujii et al. |
| 2004/0102565 | A1 | | 5/2004 | Maekawa et al. |

FOREIGN PATENT DOCUMENTS

| DE | 10029699 | | 12/2001 |
| EP | 1167425 | | 2/2000 |
| EP | 1172407 | | 6/2001 |
| EP | 1331255 | | 10/2001 |
| JP | 2002256211 A | * | 9/2002 |
| WO | 01/02499 | | 1/2001 |
| WO | 03/011787 | | 2/2003 |

OTHER PUBLICATIONS

Full English-language translation of JP 2002-256211, Sep. 11, 2002.*

* cited by examiner

*Primary Examiner*—Vasu Jagannathan
*Assistant Examiner*—Vickey Ronesi
(74) *Attorney, Agent, or Firm*—Fisher, Christen & Sabol

(57) ABSTRACT

An automobile body-used light-colored water based coating composition containing a water dispersion ($A_1$) prepared by water-dispersing a block copolymer resin (A) comprising a copolymer ($a_1$) obtained by copolymerizing a monomer component containing an olefin monomer and a copolymer ($a_2$) obtained by copolymerizing a monomer component containing a carboxyl group or carboxylic anhydride group-containing vinyl monomer, a hydroxyl group-containing resin (B), a curing agent (C) and a color pigment, a resulting coating film having a lightness L* value in accordance with a L*a*b* color system as defined in JIS Z 8729 in the range of 80 or more.

13 Claims, No Drawings

AUTOMOBILE BODY-USED LIGHT-COLORED WATER BASED COATING COMPOSITION

This application has priority benefit of Japanese Patent Application No. 03/355457, filed on Oct. 15, 2003, that has priority benefit of Japanese Patent Application No. 04/295016, filed on Oct. 7, 2004.

BACKGROUND ART

1. Field of the Invention

The present invention relates to an automobile body-used light-colored water based coating composition capable of forming a multi-layer coating film showing excellent properties in yellowing resistance, anti-chipping properties and finish properties, and to a multi-layer coating film-forming method by use of the water based coating composition.

2. Description of Background Art

Particularly, an external panel of the automobile body is usually coated with a multi-layer coating film comprising an undercoat coating film with an electrodeposition coating composition, an intercoat coating film and a topcoat coating film for the purpose of imparting anti-corrosive properties and beautiful appearance. While an automobile is running, pebbles, gravels, anti-freezing agents, ice bumps, etc. on the road may rebound so as to collide against the automobile body, resulting in drawbacks of making mars on the multi-layer coating film, locally braking and peeling off the multi-layer coating film, showing poor appearance, exposing a metal substrate, developing rusts for corrosion (these drawbacks may be called as "chipping" hereinafter).

On the other hand, a coating composition using an organic solvent has mainly been used in the art. Since the use of the organic solvent may have a matter of concern about influences on health and environment due to a solvent vapor volatilized into the atmosphere, the use of a water based coating composition for use in the automobile has been advanced, and in the field of the intercoat coating composition for use in the automobile, developments of a water based intercoat coating composition imparted with various kinds of functions have been made.

Recently, in a multi-layer coating film for use in an automobile outer plate, a white pearl coating color using a mica as a luster agent is becoming a mainstream, and for the purpose of imparting anti-chipping properties, a blocked polyisocyanate curing agent is used in the intercoat coating composition, wherein a blocking agent such as methyl ethyl ketoxime, alcohol and the like is used. The use of the methyl ethyl ketoxime as the blocking agent may produce a problem of a film yellowing due to heat curing, resulting in making difficult a white pearl coating color design in a coating composition having anti-chipping properties. The use of alcohol as the blocking agent may not result yellowing, but a high dissociation temperature of the blocking agent makes it impossible to obtain a satisfactory curing properties in a temperature range of curing the automobile intercoat coating composition.

Japanese Patent Application Laid-Open No. 2000-281960 discloses a coating composition containing an emulsion prepared by water-dispersing a resin particle containing an olefin polymer and an acrylic polymer in the same particle.

Japanese Patent Application Laid-Open No. 2001-98140 discloses a water dispersion prepared by water-dispersing a block copolymer obtained by copolymerizing a polymer comprising an olefin monomer and a carboxyl group or a carboxylic anhydride group-having vinyl monomer.

A simple addition of the above emulsion or the water dispersion into a water based coating composition for the purpose of improving anti-chipping properties makes impossible to obtain a coating film showing excellent properties in yellowing resistance and anti-chipping properties, so that improvements therefor are demanded.

SUMMARY OF THE INVENTION

It is an object of the present invention to provide an automobile body-used light-colored water based coating composition capable of forming a coating film showing excellent properties in yellowing resistance and anti-chipping properties.

The present inventors made intensive studies for the purpose of solving the above problems in the art to find out that use of an automobile body-used light-colored water based coating composition containing a water dispersion ($A_1$) prepared by water-dispersing a block copolymer resin (A) comprising a copolymer ($a_1$) obtained by copolymerizing a monomer component containing an olefin monomer and a copolymer ($a_2$) obtained by copolymerizing a monomer component containing a carboxyl group or carboxylic anhydride group-containing vinyl monomer, a hydroxyl group-containing resin (B), a curing agent (C) and a color pigment, can solve the above problems, resulting in completing the present invention.

That is, the present invention relates to:

1. An automobile body-used light-colored water based coating composition containing a water dispersion ($A_1$) prepared by water-dispersing a block copolymer resin (A) comprising a copolymer ($a_1$) obtained by copolymerizing a monomer component containing an olefin monomer and a copolymer ($a_2$) obtained by copolymerizing a monomer component containing a carboxyl group or carboxylic anhydride group-containing vinyl monomer, a hydroxyl group-containing resin (B), a curing agent (C) and a color pigment, a resulting coating film having a lightness L* value in accordance with a L*a*b* color system as defined in JIS Z 8729 in the range of 80 or more, 2. An automobile body-used light-colored water based coating composition as described in paragraph 1, wherein the curing agent (C) includes a blocked polyisocyanate curing agent blocked with a pyrazole compound, 3. An automobile body-used light-colored water based coating composition as described in paragraph 2, wherein the pyrazole compound is 3,5-dimethylpyrazole, 4. An automobile body-used light-colored water based coating composition as described in any one of paragraphs 1 to 3, the water dispersion ($A_1$) is contained in the range of 0.1 to 30 parts by weight as solid content per 100 parts by weight of a total solid content of the hydroxyl group-containing resin (B) and the curing agent (C), 5. An automobile body-used light-colored water based coating composition as described in any one of paragraphs 1 to 4, wherein a water dispersion ($D_1$) prepared by water-dispersing a resin particle (D) containing in the same particle the copolymer of the olefin monomer and the copolymer of a vinyl monomer is contained in the range of 30 parts by weight or less as solid content per 100 parts by weight of a total solid content of the hydroxyl group-containing resin (B) and the curing agent (C), 6. An automobile body-used light-colored water based coating composition as described in any one of paragraphs 1 to 5, wherein an urethane emulsion (E) is contained in the range of 1 to 30 parts by weight as solid content per 100 parts by weight of a total solid content of the hydroxyl group-containing resin (B) and the curing agent (C), 7. A multi-layer coating film-forming method which comprises successive steps (1) to (3):

step (1) of coating an automobile body-used light-colored water based coating composition as described in any one of paragraphs 1 to 6 onto a metal coating substrate or an electrodeposition coating-treated coating substrate without coating an anti-chipping primer to form an uncured coating film or to form a cured coating film by heat curing and drying, step (2) of coating a topcoat coating composition by at least one layer onto the coating film formed in step (1) to form an uncured topcoat coating film, and step (3) of heat curing and drying a multi-layer coating film formed in steps (1) and (2), and 8. A multi-layer coating film-forming method as described in paragraph 7, wherein the coating substrate is an integral coating substrate comprising an electrodeposition coating-treated metal member and a plastics member.

DETAILED DESCRIPTION OF THE INVENTION

A coating film formed from the automobile body-used light-colored water based coating composition of the present invention has a lightness L* value in accordance with a L*a*b* color system as defined in JIS Z 8729 in the range of 80 or more.

The automobile body-used light-colored water based coating composition of the present invention and the multi-layer coating film-forming method are explained more in detail hereinafter.

Water Dispersion ($A_1$) Prepared by Water-Dispersing Block Copolymer Resin (A):

The water-dispersion ($A_1$) is a water dispersion obtained by water-dispersing a block copolymer resin (A) comprising a copolymer ($a_1$) obtained by copolymerizing a monomer component containing an olefin monomer and a copolymer ($a_2$) obtained by copolymerizing a monomer component containing a carboxyl group or carboxylic anhydride group-containing vinyl monomer.

The olefin monomer may include, for example, α-olefin such as ethylene, propylene, 1-butene, 2-methyl-1-butene, 3-methyl-1-butene, 1-pentene, 4-methyl-1-pentene, 1-hexene, 1-octene, 1-decene, 1-octadecene and the like; a conjugated diene such as 2-butene, isobutylene, butadiene, isoprene and the like; cyclopentadiene, vinylcyclohexane, a monomer derived from β-pinene, etc., and the like. The copolymer ($a_1$) may include at least one of the above monomers.

The copolymer ($a_1$) may optionally contain a vinyl monomer copolymerizable with the olefin monomer. The vinyl monomer copolymerizable with the olefin monomer may include, for example, acrylonitrile; a vinyl ester such as vinyl acetate, vinyl pivalate and the like; (meth)acrylic ester such as methyl (meth)acrylate, ethyl (meth)acrylate, butyl (meth)acrylate, dodecyl (meth)acrylate, 2-ethylhexyl (meth) acrylate, and the like; (meth)acrylamide; N-vinyl-2-pyrrolidone and the like. These may be used alone or in combination. Of these, methyl acrylate, ethyl acrylate, and vinyl acetate are preferable.

The copolymer ($a_1$) has a number average molecular weight in the range of 1,000 to 100,000, preferably 2,500 to 50,000.

The number average molecular weight in the present invention represents a molecular weight calculated in terms of styrene by GPC.

The copolymer ($a_2$) is obtained by copolymerizing a monomer component containing a carboxyl group or carboxylic anhydride group-containing vinyl monomer. The carboxyl group-containing vinyl monomer may include, for example, acrylic acid, methacrylic acid, crotonic acid, cinnamic acid, itaconic acid, maleic acid and the like. These may be used alone or in combination. Of these, acrylic acid and methacrylic acid are preferable.

The carboxylic anhydride group-containing monomer may include, for example, maleic anhydride, itaconic anhydride, citraconic anhydride, butenyl succinic anhydride, tetrahydrophthalic anhydride, and the like. These may be used alone or in combination. Of these, maleic anhydride is preferable.

Other vinyl monomer may include, for example, a styrene based monomer such as styrene, p-styrene sulfonic acid, sodium salt thereof, potassium salt thereof, and the like; (meth)acrylonitrile; a vinyl ester such as vinyl acetate, vinyl pivalate and the like; a (meth)acrylic ester such as methyl (meth)acrylate, ethyl (meth)acrylate, butyl (meth)acrylate, dodecyl (meth)acrylate, 2-ethylhexyl (meth)acrylate and the like; (meth)acrylamide; N-vinyl-2-pyrrolidone, and the like. These may be used alone or in combination. Of these, methyl (meth)acrylate, ethyl (meth)acrylate, styrene, vinyl acetate are preferable.

The copolymer ($a_2$) has a number average molecular weight in the range of 1,000 to 100,000, preferably 2,500 to 50,000. The block copolymer has a number average molecular weight in the range of 2,000 to 200,000, preferably 5,000 to 100,000.

The block copolymer resin (A) may be prepared, for example, by subjecting the monomer component constituting the copolymer ($a_2$) to radical polymerization in the presence of a copolymer ($a_1$) having a terminating mercapto group.

The terminating mercapto group-having copolymer ($a_1$) may be obtained by various kinds of methods, for example, a method which comprises taking place addition reaction of a thio-S-acetic acid, thio-S-benzoic acid, thio-S-propionic acid, thio-S-butyric acid, thio-S-valerianic acid or the like to a terminating double bond-having polyolefin polymer, a method of using ethylene sulfide as an inhibitor on preparing polyolefin by an anionic polymerization method, and the like.

The water dispersion ($A_1$) may be prepared by dispersing the block copolymer resin (A) comprising copolymer ($a_1$) and copolymer ($a_2$) into an aqueous solution of a basic substance in 0.05 equivalent or more, preferably 0.2 to 5.0 equivalents, more preferably 0.3 to 1.5 equivalents relative to the carbonyl group or carboxylic anhydride group in copolymer ($a_2$) at a temperature of a melting temperature of the block copolymer resin. (A) or higher.

The basic substance may include, for example, an amine compound such as ammonia, hydroxyamine, ammonium hydroxide, hydrazine, hydrazine hydrate, (di)methylamine, (di)ethylamine, (di)propylamine, (di)butylamine, (di)hexylamine, (di)octylamine, (di)ethanolamine, (di)propanolamine, N-methyldiethanolamine, triethylamine, N,N-dimethyl ethanolamine, 2-dimethylamino-2-methyl-1-propanol, 2-amino-2-methyl-1-propanol, cyclohexylamine, tetramethylammonium hydroxide and the like; a metal oxide such as sodium oxide, sodium peroxide, potassium oxide, potassium peroxide, calcium oxide, strontium oxide, barium oxide and the like; a metal hydroxide such as barium hydroxide, sodium hydroxide, potassium hydroxide, calcium hydroxide, and the like; metal hydride such as sodium hydroxide, potassium hydride, calcium hydride, and the like; a carbonate such as sodium carbonate, potassium carbonate, sodium bicarbonate, potassium bicarbonate, calcium bicarbonate and the like; an acetate such as sodium acetate, potassium acetate, calcium acetate and the like; and the like.

Of these, from the standpoints of easy availability and water dispersion-stability, ammonia, (di)methylamine, (di)ethylamine, (di)propylamine, N-methyl diethanolamine, triethylamine, N,N-dimethyl ethanolamine, 2-dimethylamino-2-methyl-1-propanol, 2-amino-2-methyl-1-propanol, (di)butylamine, sodium hydroxide and potassium hydroxide are preferable, and ammonia, N,N-dimethyl ethanolamine, sodium hydroxide and potassium hydroxide are more preferable.

A mixing amount of the water dispersion $(A_1)$ in the automobile body-used light-colored water based coating composition is in the range of 0.1 to 30 parts by weight, preferably 1 to 15 parts by weight, more preferably 3 to 10 parts by weight as solid content per 100 parts by weight of a total solid content of the hydroxyl group-containing resin and the curing agent.

A mixing amount more than 30 parts by weight may reduce stability of the coating composition. A mixing amount less than 0.1 part by weight may provide no effect on improving anti-chipping properties.

Water Dispersion $(D_1)$ Prepared by Water-Dispersing Resin Particle (D):

The automobile body-used light-colored water based composition of the present invention further contains a water dispersion $(D_1)$ prepared by water-dispersing a resin particle (D) containing in the same particle a copolymer of an olefin monomer and a copolymer of a vinyl monomer, resulting in improving anti-chipping properties.

The resin particle (D) contains the olefin copolymer and the vinyl copolymer in the same particle, and a structure of the resin particle (D) is not particularly limited and may include, for example, a core/shell structure, composite structure, localized structure, potbelly-shaped structure, octopus-shaped structure, raspberry-shaped structure, multi-particle composite structure and IPN structure.

The water dispersion $(D_1)$ prepared by water-dispersing the resin-particle (D) is prepared by subjecting the vinyl monomer to polymerization in the presence of an emulsion prepared by dispersing olefin polymer particles into water, wherein a vinyl polymer is formed within the olefin polymer particle.

The olefin monomer is not particularly limited, but may include, for example, α-olefin such as ethylene, propylene, 1-butene, 3-methyl-1-butene, 4-methyl-1-pentene, 3-methyl-1-pentene, 1-heptene, 1-hexene, 1-decene, 1-dodecene and the like; a conjugated diene and non-conjugated diene such as butadiene, ethylidene-norbornene, dicyclopentadiene, 1,5-hexadiene and the like; and the like. These may be used alone or in combination.

A monomer other than the olefin monomer used in copolymerization in the preparation of the olefin polymer may include any monomer copolymerizable with the olefin monomer without particular limitations, for example, vinyl acetate vinyl alcohol and the like. These monomers may be used alone or in combination.

Specific examples of the olefin polymer may include, for example, a homopolymer, random copolymer or block copolymer of α-olefin such as ethylene, propylene, 1-butene, 3-methyl-1-butene, 4-methyl-1-pentene, 3-methyl-1-pentene, 1-heptene, 1-hexene, 1-decene, 1-dodecene and the like, for example, low density polyethylene, high density polyethylene, polypropylene, poly-1-butene, poly-3-methyl-1-butene, poly-4-methyl-1-pentene, poly-3-methyl-1-pentene, ethylene-propylene copolymer, ethylene-1-butene copolymer, propylene-1-butene copolymer and propylene-1-butene-ethylene copolymer; a copolymer of α-olefin with a diene such as a conjugated diene, non-conjugated diene and the like, for example, ethylene-butadiene copolymer and ethylene-ethylidene-norbornene; a terpolymer of at least two α-olefin with a conjugated diene or non-conjugated diene, for example, ethylene-propylene-butadiene terpolymer, ethylene-propylene-dicyclopentadiene terpolymer, ethylene-propylene-ethylidene-norbornene terpolymer, ethylene-propylene-1,5-hexadiene terpolymer and the like; a copolymer of an olefin resin with other thermoplastic monomer, for example, ethylene-vinyl acetate copolymer, ethylene-vinyl alcohol copolymer and the like, and the like.

The vinyl monomer is not particularly limited, and may include, for example, (meth)acrylic esters, particularly $C_{1-12}$ alkyl esters such as methyl acrylate, ethyl acrylate, n-butyl acrylate, i-butyl acrylate, 2-ethylhexyl acrylate, lauryl acrylate and the like; aromatic monomer such as styrene, α-methyl styrene and the like; polar group-containing monomer, for example, hydroxyl group-containing hydroxylalkyl acrylates such as hydroxyethyl acrylate, hydroxypropyl acrylate, hydroxyethyl methacrylate, hydroxypropyl methacrylate and the like; respectively carboxyl group-containing acrylic acid, methacrylic acid, crotonic acid, itaconic acid, fumaric acid, maleic acid and the like; other polar group-containing monomer such as acrylonitrile, methacrylonitrile, acrylamide, methacrylamide, glycidyl methacrylate and the like. These may be used alone or in combination.

In the case where the carboxyl group-containing monomer is used as the vinyl monomer, the carboxy group-containing monomer may be used in an amount of 5% by weight or less, preferably less than 3% by weight, more preferably none based on 100% by weight of a total amount of the acrylic monomer. An amount of more than 5% by weight of the carboxyl group-containing monomer may make it difficult to form the vinyl polymer within an olefin polymer particle.

A weight ratio of the olefin polymer to the vinyl polymer is such that the olefin polymer is 95 to 10% by weight and the vinyl polymer is 5 to 90% by weight, preferably the olefin polymer is 95 to 30% by weight and the vinyl polymer is 5 to 70% by weight, more preferably the olefin polymer is 95 to 40% by weight and the vinyl polymer is 5 to 60% by weight based on a total weight of the olefin polymer and the vinyl polymer.

An olefin polymer less than 10% by weight can not develop features of the olefin polymer, for example, may reduce adhesion properties to a non-polar substrate. To the contrary, an olefin polymer more than 95% by weight can not develop features of the vinyl polymer, for example, may reduce adhesion properties to a polar substrate.

A polymerization initiator used in the preparation of the vinyl polymer may include any ones used in emulsion polymerization, for example, hydrogen peroxide; persulfate such as ammonium persulfate, potassium persulfate, sodium persulfate and the like; organic peroxide such as cumene hydroperoxide, t-butyl hydroperoxide, benzoyl peroxide, t-butylperoxy-2-ethylhexanoate, t-butylperoxybenzoate, lauroyl peroxide and the like; azo compound such as azo-bisisobutylonitrile and the like; a redox initiator comprising a combination of the above initiators with a reducing agent, for example, a metal ion such as iron ion, sodium sulfoxylate, formaldehyde, sodium pyrosulfite, sodium bisulfite, L-ascorbic acid, Rongalite (sodium formaldehyde sulfoxylate) and the like. These may be used alone or in combination. Specific examples of a preferable initiator may include ones having a water solubility of 0 to 10%, preferably 0 to 5%, more preferably 0 to 3%.

Use of an initiator having a water solubility more than 10% makes difficult to form the vinyl copolymer within the olefin polymer particle. The initiator is practically used in an amount of 0.1 to 5% by weight. Optionally, mercaptans such as t-dodecylmercaptan, n-dodecylmercaptan and the like, allyl compounds such as allyl sulfonic acid, methallylsulfonic acid, sodium salts thereof and the like, and the like may be used as a molecular weight controlling agent.

On polymerizing the vinyl monomer in the presence of the olefin emulsion, a surface active agent usually used in emulsion polymerization may be used for the purpose of improving stability of the resin particle.

The surface active agent may specifically include, for example, an anionic surface active agent, non-ionic surface active agent, cationic surface active agent, other reactive surface active agent and the like. These may be used alone or in combination. The non-ionic surface active agent may include, for example, polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, tert-octylphenoxyethyl polyethoxyethanol, nonylphenoxyethyl polyethoxyethanol and the like.

The anionic surface active agent may include, for example, sodium dodecylbenzene sulfonate, sodium lauryl sulfate, sodium alkyldiphenyl ether disulfonate, sodium alkylnaphthalene sulfonate, sodium dialkylsulfosuccinate, sodium stearate, potassium oleate, sodium dioctyl sulfosuccinate, sodium polyoxyethylene alkyl ethyl ether sulfate, sodium polyoxyethylene alkyl phenyl ether sulfate, sodium oleate, sodium tert-octylphenoxyethoxypolyethoxyethyl sulfate salt, and the like.

The cationic surface active agent may include, for example, lauryl trimethyl ammonium chloride, stearyl trimethyl ammonium chloride and the like.

An amount of the surface active agent may not particularly be limited. However, too much amount of the surface active agent may form a resin particle composed of vinyl polymer only, and may make it difficult to form vinyl polymer within an olefin polymer particle. The surface active agent may usually be used in an amount of 0.02 to 5% by weight based on a total weight of the vinyl monomer. Respective monomers as above described may be added in the lump, by divided parts, or continuously dropping, and subjected to polymerization at 0 to 100° C., preferably 30 to 90° C. in the presence of the polymerization initiator.

A mean particle size in the water dispersion ($D_1$) is 0.01 μm to 100 μm, preferably 0.01 μm to 10 μm, more preferably 0.01 μm to 2 μm.

A mixing amount of the water dispersion ($D_1$) in the automobile body-used light-colored water based coating composition is in the range of 30 parts by weight or less, preferably 5 to 20 parts by weight per 100 parts by weight of a total solid content of the hydroxyl group-containing resin and the curing agent.

Urethane Emulsion (E):

The automobile body-used light-colored water based coating composition of the present invention may preferably contain an urethane emulsion (E).

The urethane emulsion (E) is an emulsion obtained by use of a reaction product of an aliphatic and/or alicyclic diisocyanate, at least one diol selected from polyether diol, polyester diol and polycarbonate diol having a number average molecular weight of 500 to 5,000, a low molecular weight polyhydroxy compound and a dimethylol alkane acid, specifically is a self-emulsifiable urethane emulsion having a mean particle size of 0.001 to 3 μm and prepared by a method which comprises polymerizing the aliphatic and/or alicyclic diisocyanate, at least one diol selected from polyether diol, polyester diol and polycarbonate diol having the number average molecular weight of 500 to 5,000, the low molecular weight polyhydroxy compound and the dimethylol alkane acid in the presence of a hydrophilic organic solvent not having an active hydrogen reactable with isocyanate group in the molecule at a NCO to OH equivalent ratio of 1.1 to 1.9 by a one shot method or a multi-stage method to obtain an urethane prepolymer, followed by neutralizing the prepolymer with a tertiary amine and mixing with water to take place a water-lengthening reaction, or followed by mixing with water to take place a water-lengthening reaction, while neutralizing the prepolymer with a tertiary amine, emulsifying and dispersing into water, and by optionally distilling off the organic solvent.

Examples of trade names for the urethane emulsion may include U Coat UX-497, U Coat UX4300, U Coat UX5000, U Coat UX8100 (trade names, all marketed by Sanyo Chemical Industries, Ltd.), Neo Rez R-940, R-941, R-960, R-962, R-966, R-967, R-962, R-9603, R-9637, R-9618, R-9619, XR-9624, Vondic 1310NSC (trade names, all marketed by Imperial Chemical Industries PLC), Hydran HW-310, HW-311, HW-312B, HW-301, HW-111, HW-140, HW-333, HW-340, HW-350, HW-910, HW-920, HW-930, HW-935, HW-940, HW-960, HW-970, HW-980, AP-10, AP-20, AP-30, AP-40, AP-60, AP-70, AP-60LM and the like (trade names, all marketed by Dainippon Ink & Chemicals Inc.), and the like.

A mixing amount of the urethane emulsion (E) is in the range of 0 to 30 parts by weight, preferably 5 to 20 parts by weight per 100 parts by weight of a total solid content of the hydroxyl group-containing resin and the curing agent.

The hydroxyl group-containing resin (B) in the automobile body-used light-colored water based coating composition may include at least one active hydrogen-containing compound, for example, ones selected from polyhydroxy-polyesters, polylactones, hydroxypolycarbonates, polythioethers, polyacetals, polyether esters, polyester amides and polyamide-polyamine resin such as a product obtained from a dimerized aliphatic acid and aliphatic acid polyamide, and the active hydrogen atom-containing compound may preferably include a carboxyl group and hydroxyl group-containing polyester resin, acrylic resin, polyether resin, polycarbonate resin, urethane resin, tertiary amine group-containing hydroxyacrylic resin, and the like. Of these, the polyester resin and the acrylic resin are preferable.

The above polyester resin is a resin prepared by reacting a polybasic acid and a polyhydric alcohol.

Of the polyester resin, a polyester resin containing as an essential component an alicyclic polybasic acid and/or an alicyclic polyhydric alcohol is preferable from the standpoint of anti-chipping properties.

The alicyclic polybasic acid is a compound having at least one alicyclic structure mainly of 4 to 6 membered rings and at least two carboxyl groups in one molecule, and may include, for example, 1,3-cyclohexane dicarboxylic acid (hexahydroisophthalic acid), 1,4-cyclohexane dicarboxylic acid (hexahydroterephthalic acid), hexahydrophthalic acid, hexahydrotrimellitic acid, methylhexahydrophthalic acid, and anhydrides thereof. Of these, 1,4-cyclohexane dicarboxylic acid is preferable.

The other polybasic acid is a compound having at least two carboxyl groups in one molecule, and may include, for example, phthalic acid, isophthalic acid, terephthalic acid, naphthalene dicarboxylic acid, 4,4-diphenyl dicarboxylic acid, 4,4'-diphenylmethane-dicarboxylic acid, succinic acid, adipic acid, azelaic acid, sebacic acid, HET acid, maleic acid, fumaric acid, itaconic acid, trimellitic acid, pyromellitic acid, anhydrides thereof.

The alicyclic polyhydric alcohol is a compound having at least one alicyclic structure of mainly 4 to 6 membered rings and at least two hydroxyl groups in one molecule, and may include, for example, 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane and the like. Of these 1,4-cyclohexanedimethanol is preferable.

Of the other polyhydric alcohol, a polyhydric alcohol having two hydroxyl groups in one molecule may include, for example, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polylactonediol obtained by addition of lactones such as e-caprolactone and the like, polyester diols such as bis(hydroxyethyl) terephthalate and the like.

Of the other polyhydric alcohol, a polyhydric alcohol having at least three hydroxyl groups in one molecule may include, for example, glycerin, trimethylolpropane, trimethylolethane, diglycerin, triglycerin, 1,2,6-hexanetriol, pentaerythritol, dipentaerythritol, sorbitol, mannitol and the like.

A content of the alicyclic polybasic acid and/or the alicyclic polyhydric alcohol in the polyester resin is in the range of 20 to 70% by weight, preferably 30 to 60% by weight, more preferably 35 to 50% by weight based on a total solid content of monomers constituting the polyester resin.

The polyester resin obtained by reacting the alicyclic polybasic acid and the alicyclic polyhydric alcohol has a weight average molecular weight in the range of 1,000 to 1000,000, preferably 2,000 to 10,000, a hydroxyl value in the range of 30 to 200 mgKOH/g, preferably 50 to 180 mgKOH/g, and an acid value in the range of 5 to 100 mgKOH/g, preferably 10 to 60 mgKOH/g.

The hydroxyl group-containing acrylic resin in the present invention may be prepared by copolymerizing a polymerizable monomer component containing a hydroxyl group-containing polymerizable vinyl monomer, and may preferably have a number average molecular weight of 1000 to 50000, particularly 2000 to 20000, a hydroxyl value of 20 to 200 mgKOH/g, particularly 50 to 150 mgKOH/g, and an acid value of 3 to 100 mgKOH/g, particularly 20 to 70 mgKOH/g.

The hydroxyl group-containing polymerizable vinyl monomer is a compound having at least one hydroxyl group and polymerizable unsaturated bond respectively in one molecule, and may include, for example, monoester compounds of $C_{2-20}$ dihydric alcohol with (meth)acrylic acid such as hydroxyethyl (meth)acrylate, hydroxypropyl. (meth)acrylate, hydroxybutyl (meth)acrylate and the like, and the like. The vinyl monomer is a monoester compound of (meth)acrylic acid with $C_{1-22}$ monohydric alcohol, and may include, for example, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate and the like.

The polyester resin and the acrylic resin in the water based coating composition of the present invention may be used in combination with an urethane-modified polyester resin and an urethane-modified acrylic resin prepared by subjecting a part of hydroxyl groups in the resins and a polyisocyanate compound to an urethanization reaction for chain-lengthening and forming high molecular weight resins respectively.

The polyisocyanate compound may include, for example, aliphatic polyisocyanates such as hexamethylene diisocyanate, trimethylhexamethylene diisocyanate, dimer acid diisocyanate, lysine diisocyanate, and the like; biuret type ring adducts of the above polyisocyanate, isocyanuric type adducts, and the like; alicyclic diisocyanates such as isophorone diisocyanate, 4,4'-methylenebis(cyclohexylisocyanate), methylcyclohexane-2,4-(or -2,6-) diisocyanate, 1,3-(or 1,4-) di(isocyanatomethyl)cyclohexane, 1,4-cyclohexane diisocyanate, 1,3-cyclopentane diisocyanate, 1,2-cyclohexane diisocyanate and the like; biuret type adducts of the above polyisocyanate, isocyanuric ring type adducts; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl) sulfone, isopropylidenebis(4-phenylisocyanate) and the like; biuret type adducts of the above polyisocyanates, isocyanuric type ring adducts; polyisocyanates having at least three isocyanate groups in one molecule, for example, triphenylmethane-4,4'-4"-triisocyanate, 1,3,5-triisocyanatobenzene, 2,4,6-triisocyanatotoluene, 4,4'-dimethyldiphenylmethane-2,2',5,5'-tetraisocyanate and the like; biuret type adducts of the above polyisocyanates, isocyanuric type ring adducts; urethanized adducts obtained by reacting a polyisocyanate compound with a polyol such as ethylene glycol, propylene glycol, 1,4-butylene glycol, dimethylolpropionic acid, polyalkylene glycol, trimethylolpropane, hexanetriol and the like in an excess amount of isocyanate group to hydroxyl group of the polyol; biuret type adducts of the above polyisocyanates, isocyanuric type ring adducts; and the like.

The curing agent (C) used as a crosslinking component may include a water-dispersible blocked polyisocyanate obtained by blocking an isocyanate group of an isocyanate having at least two free isocyanate groups in one molecule with a blocking agent, melamine resin and the like.

The polyisocyanate in the curing agent (C) may include, for example, aliphatic polyisocyanates such as hexamethylene diisocyanate, trimethylhexamethylene diisocyanate, dimer acid diisocyanate, lysine diisocyanate, and the like; biuret type adducts of the above polyisocyanate, isocyanuric ring type adducts, and the like; alicyclic diisocyanates such as isophorone diisocyanate, 4,4'-methylenebis (cyclohexylisocyanate), methylcyclohexane-2,4-(or -2,6-) diisocyanate, 1,3-(or 1,4-) di(isocyanatomethyl)cyclohexane, 1,4-cyclohexane diisocyanate, 1,3-cyclopentane diisocyanate, 1,2- cyclohexane diisocyanate and the like; biuret type adducts of the above polyisocyanate, isocyanuric ring type adducts; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl) sulfone, isopropylidenebis (4-phenylisocyanate) and the like; biuret type adducts of the above polyisocyanates, isocyanuric type ring adducts; polyisocyanates having at least three isocyanate groups in one molecule, for example, triphenylmethane-4,4'-4'''-triisocyanate, 1,3,5-triisocyanatobenzene, 2,4,6-triisocyanatotoluene, 4,4'-dimethyldiphenylmethane-2,2',5,5'-tetraisocyanate and the like; biuret type adducts of the above polyisocyanates, isocyanuric type ring adducts; urethanized adducts obtained by reacting a polyisocyanate compound with a polyol such as ethylene glycol, propylene glycol, 1,4-butylene glycol, dimethylolpropionic acid, polyalkylene glycol, trimethylolpropane, hexanetriol and the like in an excess amount of isocyanate group to hydroxyl group of the polyol; biuret type adducts of the above polyisocyanates, isocyanuric type ring adducts; and the like.

The blocking agent used in the curing agent (C) blocks a free isocyanate group, so that heating at 100° C. or higher, preferably 130° C. or higher, for example, may dissociate the blocking agent, resulting in making it possible to react the isocyanate group of the polyisocyanate with the hydroxyl group of the hydroxyl group-containing resin (B).

A preferable blocking agent for the purpose of obtaining a coating film having a L* value of 80 or more in the L*a*b* color system defined in JIS Z 8729 may include, for example, a pyrazole compound such as 3,5-dimethylpyrazole, 3-methylpyrazole, 4-nitro-3,5-dimethylpyrazole, 4-bromo-3,5-dimethylpyrazole and the like. Of these, 3,5-dimethylpyrazole is preferable.

The curing agent (C) may also include other blocking agents known in the art and used alone or in combination, for example, phenols such as phenol, cresol, xylenol, nitrophenol, ethylphenol, hydroxydiphenyl, butylphenol, isopropylphenol, nonylphenol, octylphenol, methyl hydroxybenzoate, and the like; lactams such as ε-caprolactam, δ-valerolactam, γ-butylolactam, β-propiolactam, and the like; aliphatic alcohols such as methanol, ethanol, propyl alcohol, butyl alcohol, amyl alcohol, lauryl alcohol and the like; ethers such as ethylene glycol monomethyl ether; ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolates such as methyl glycolate, ethyl glycolate, butyl glycolate and the like; lactic acid, lactates such as methyl lactate, ethyl lactate, butyl lactate and the like; alcohols such as methylol urea, methylol melamine, diacetone alcohol, 2-hydroxyethyl acrylate, 2-hydroxyethyl methacrylate and the like; oximes such as formamideoxime, acetamideoxime, acetoxime, methylethylketooxime, diacetylmonooxime, benzophenoneoxime, cyclohexaneoxime and the like; active methylenes such as dimethyl malonate, diethyl malonate, ethyl acetoacetate, methyl acetoacetate, acetylacetone and the like; mercaptans such as butylmercaptan, t-butylmercaptan, hexylmercaptan, t-dodecylmercaptan, 2-mercaptobenzothiazole, thiophenol, methylthiophenyl, ethylthiophenyl and the like; acid amides such as acetanilide, acetanisizide, acetotoluide, acrylamide, methacrylamide, acetic acid amide, stearic acid amide.

The water-dispersible blocked polyisocyanate is a blocked polyisocyanate made water-dispersible by blocking the isocyanate group of the polyisocyanate with a blocking agent and hydroxymonocarboxylic acids, while neutralizing the carboxyl group of hydroxycarboxylic acids.

In the water-dispersible blocked polyisocyanate, the same polyisocyanate compounds as those exemplified in the blocked polyisocyanate curing agent may be used. Of these, hexamethylene diisocyanate (HMDI), derivatives of hexanethylene diisocyanate (HMDI), isophorone diisocyanate (IPDI) and derivatives of isophorone diisocyanate (IPDI) are preferable.

Preparation of the water-dispersible blocked polyisocyanate is carried out so that the isocyanate group of polyisocyanate is blocked with the blocking agent, while addition of at least one isocyanate group to the hydroxyl group of hydroxymonocarboxylic acids takes place so as to react the isocyanate group of the polyisocyanate with hydroxymonocarboxylic acids.

The blocking agent may include the same blocking agent as those exemplified in the blocked polyisocyanate curing agent. Preferable blocking agents for the purpose of obtaining a light-colored coating film having a lightness L* value of 80 or more in accordance with the L*a*b* color system as defined in JIS Z 8729 may include, for example, a pyrazole compound such as 3,5-dimethylpyrazole, 3-methylpyrazole, 4-nitro-3,5-dimethylpyrazole, 4-bromo-3,5-dimethylpyrazole and the like.

The blocked polyisocyanate curing agent (C) in the present invention preferably a blocked polyisocyanate curing agent blocked with 3,5-dimethylpyrazole blocking agent.

The hydroxymonocarboxylic acid may preferably include 2-hydroxyacetic acid, 3-hydroxypropanoic acid, 12-hydroxy-9-octadecanoic acid (ricinoleic acid), 3-hydroxy-2,2-dimethylpropanoic acid (hydroxypivalic acid), dimethylolpropionic acid (DMPA) and the like. Of these, 3-hydroxy-2,2-dimethylpropanoic acid (hydroxypivalic acid) is preferable.

A solvent used in the above reaction may include preferably ones having no reactivity with isocyanate group, for example, ketones such as acetone, methyl ethyl ketone and the like, esters such as ethyl acetate and the like, N-methylpyrrolidone (NMP) and the like. A mixing ratio of the curing agent (C) to the hydroxyl group-containing resin (B) is such that a functional group ratio (NCO/OH) of isocyanate group (NCO) is in the range of 0.8 to 1.3.

The melamine resin used as the curing agent (C) may include a methylol amino resin obtained by reacting melamine with aldehyde. The aldehyde may include formaldehyde, paraformaldehyde, acetaldehyde, benzaldehyde and the like. The above melamine resin may also include ones obtained by etherifying a part or all of the methylol group in the methylol amino resin with a monoalcohol. The monoalcohol used in etherification may include methyl alcohol, ethyl alcohol, n-propyl alcohol, i-propyl alcohol, n-butyl alcohol, i-butyl alcohol, 2-ethyl butanol, 2-ethyl hexanol and the like.

The melamine resin may preferably include such a melamine that at least three methylol groups on an average per one triazine nucleus are methyl etherified, and a hydrophilic melamine which is such a melamine resin that a part of the methoxy group obtained as above is substituted with a monoalcohol having 2 or more carbon atoms, and which further has an imino group, an average degree of condensation of about 2 or less, and about 50% by weight of a melamine having one triazine nucleus. Trade names of melamine resins which satisfy the above conditions may include, for example, Cymel 325 (trade name, marketed by Mitsui Cytec Ltd., imino group-containing melamine resin), and the like.

The color pigment used in the automobile body-used light-colored water based coating composition of the present invention may include any pigments used in the art, provided that the resulting coating film has a lightness $L^*$ value as defined in the $L^*a^*b^*$ color system in accordance with JIS Z 8729 of 80 or more. The color pigment may include an inorganic pigment such as titanium oxide, zinc oxide, carbon black, cadmium red, molybdenum red, chrome yellow, Prussian blue, cobalt blue and the like; and an organic pigment such as azo pigment, phthalocyanine pigment, quinacridone pigment, isoindolin pigment, threne pigment, perylene pigment and the like, and may also include a metallic pigment such as a scaly aluminum, mica, metallic oxide-coated mica, mica-shaped iron oxide and the like.

A mixing amount of the color pigment may arbitrarily be varied depending on purposes to be used, but preferably in the range of 1 to 200 parts by weight per 100 parts by weight of a total solid content of the hydroxyl group-containing resin (B) and the curing agent (C).

In the present invention, an extender pigment may also be used. The extender pigment may include, for example, clay, baryta, settling barium sulfate, barium carbonate, calcium carbonate, silica, white carbon, diatomaceous earth, magnesium carbonate, talc, aluminum flake, mica flake, and the like. Of these, talc is preferable from the standpoint of improving anti-chipping properties.

A mixing amount of the extender pigment may arbitrarily be varied depending on purposes to be used, but preferably in the range of 0 to 50 parts by weight per 100 parts by weight of a total solid content of the hydroxyl group-containing resin (B) and the curing agent (C).

The light-colored water based coating composition of the present invention may be water-dispersed by neutralizing the hydroxyl group-containing resin (B) and the curing agent (C) with a neutralizing agent.

The neutralizing agent may include, for example, hydroxides of alkali metal or alkaline earth metal such as sodium hydroxide, potassium hydroxide, lithium hydroxide, calcium hydroxide, barium hydroxide and the like; ammonia; a primary monoamine such as ethylamine, propylamine, butylamine, benzylamine, monoethanolamine, neopentanolamine, 2-aminopropanol, 3-aminopropanol and the like; a secondary monoamine such as diethylamine, diethanolamine, di-n- or di-iso-propanolamine, N-methylethanolamine, N-ethylethanolamine and the like; a tertiary monoamine such as dimethylethanolamine, trimethylamine, triethylamine, triisopropylamine, methyldiethanolamine, dimethylaminoethanol and the like; a polyamine such as diethylenetriamine, hydroxyethylaminoethylamine, ethylaminoethylamine, methylaminopropylamine and the like; and the like.

The water based coating composition of the present invention may optionally contain dispersant, anti-settling agent, organic solvent, urethane-forming reaction-promoting catalyst such as an organotin compound, hydroxy group-melamine resin crosslinking reaction-promoting catalyst such as an acid catalyst, anti-foaming agent, thickening agent, anti-corrosive agent, ultraviolet light absorbent, surface controlling agent and the like.

The coating film formed from the present coating composition shows excellent anti-chipping properties, and may preferably be used as an intercoat coating film of a multi-layer coating film formed on an external panel of the automobile body.

Coating of the coating composition of the present invention may be carried out by the conventional coating method, for example, brushing, air spray coating, airless spray coating, electrostatic coating and the like, so that a cured film thickness may be in the range of 3 to 100 am, particularly 5 to 60 µm, and that the coating film may be crosslinked and cured by heating at 120 to 170° C., particularly 130 to 160° C. for 10 to 40 minutes.

The multi-layer coating film-forming method of the present invention comprises the following steps 1 to 3.

Step 1 in the multi-layer film-forming method of the present invention is a step of coating the automobile body-used light-colored water based coating composition without coating an anti-chipping primer onto a coating substrate comprising a metal coating substrate or an electrodeposition coating-treated metal coating substrate, followed by forming an uncured coating film as it is, or heat curing to form a cured coating film.

In the above case, the above coating substrate may include a metal member—plastics member composite coating substrate prepared by subjecting an automobile-used metal member—plastics member composite substrate to electrodeposition coating, an undercoat coating composition-treated substrate such as a cationic electrodeposition coating-treated metal substrate, and the like.

The resulting coating film has a coating film thickness in the range of about 10 to 50 µm, and heat curing of the coating film may be carried out at about 100 to 180° C. for about 10 to 90 minutes.

Step 2 is a step of coating a topcoat composition by at least one layer onto a coating film formed in step 1 to form a topcoat coating film.

In the above case, at least one topcoat coating composition selected from a color coating composition such as a solid color coating composition, metallic color coating composition and the like, a clear coating composition, and the like may be coated by at least one layer to form a topcoat coating film consisting of at least one layer so as to be a coating film thickness in the range of about 10 to 70 µm. In the case where heat curing is carried out after leaving to stand for several minutes at room temperature or preheating, the heat curing may be carried out at about 100 to 180° C. for about 10 to 40 minutes.

Step 3 is a step of heat curing at about 100 to 180° C. for about 10 to 90 minutes at least one uncured coating film formed in steps 1 and 2.

The present invention can provide the following particular effects.

The present invention can provide an automobile body-used light-colored water based coating composition which is capable of forming a coating film having a lightness $L^*$ value in accordance with a $L^*a^*b^*$ color system as defined in JIS Z 8729 in the range of 80 or more, and showing excellent properties in yellowing resistance under heat curing at 130° C. or higher and anti-chipping properties.

The above excellent yellowing resistance is such that in the case of a monolayer coating film of the automobile body-used light-colored water based coating composition, difference in $b^*$ value between a $b^*$ value of a coating film heat cured under 150° C. and 30 minutes as a standard and a $b^*$ value of a coating film heat cured under 160° C. and 30 minutes is 0.5 or less as described in Examples.

Further, difference in b* value between a b* value of a coating film formed by coating a topcoat coating composition onto the standard coating film formed by coating the automobile body-used light-colored water based coating composition and heat curing under 150° C. and 30 minutes, and by heat-curing under 140° C. and 30 minutes as a standard, and a b* value of a coating film formed by coating a topcoat coating composition onto the standard coating film formed by coating the automobile body-used light-colored water based coating composition and heat curing under 150° C. and 30 minutes, and by heat curing under 160° C. and 30 minutes is 0.9 or less.

Thus, the water based coating composition of the present invention may also be applicable to a color base for a white pearl coating color.

EXAMPLE

The present invention is explained more in detail by reference to the following Examples. The present invention is not to be limited thereto. Hereinafter, "parts" and "1" represent "part by weight" and "% by weight" respectively.

Preparation Example 1

(1) A polypropylene (marketed by Mitsubishi Chemical Corporation, trade name, Mitsubish Noblen MH8) was fed to a twin-screw extruder, followed by melt-kneading and decomposing at 420° C. to obtain a polypropylene having a terminating double bond.
(2) A reactor was charged with 100 parts by weight the polypropylene having the terminating double bond as obtained in the above step (1), 1000 parts by weight of toluene and 30 parts by weight of thio-S-acetic acid, followed by sufficiently purging with nitrogen, adding 10 parts by weight of 2,2'-azobisisobutylonitrile and reacting at 90° C. for 6 hours to obtain a polypropylene having a terminating thioacetyl group.
(3) The polypropylene having the terminating thioacetyl group in an amount of 60 parts by weight was dissolved in a mixed solvent of 100 parts by weight of toluene and 20 parts by weight of n-butanol, followed by adding one part of 7% n-butanol solution of potassium hydroxide and reacting at a toluene reflux temperature under nitrogen atmosphere for 6 hours to obtain a polypropylene having a terminating mercapto group.
(4) The polypropylene having the terminating mercapto group obtained in the above step (3) in an amount of 50 parts by weight was dissolved in 500 parts by weight of toluene, followed by adding 180 parts by weight of ethyl acrylate and 20 parts by weight of acrylic acid, adding 1,1'-azobis (cyclohexane-1-carbonitrile) at 90° C. under nitrogen atmosphere, stopping the reaction at the time when a degree of polymerization reached 95%, cooling the resulting solution, and removing the solvent to obtain a block copolymer No. 1.

Preparation Example 2

The polypropylene having the terminating mercapto group as obtained in step (3) of Preparation Example 1 in an amount of 50 parts by weight was dissolved in 500 parts by weight of toluene, followed by adding 180 parts by weight of ethyl acrylate and 20 parts by weight of maleic anhydride, adding 1,1'-azobis(cyclohexane-1-carbonitrile), stopping the reaction at the time when a degree of polymerization reached 95%, cooling the resulting solution, and removing the solvent to obtain a AB type block copolymer No. 2 consisting of polypropylene block (A) and ethyl acrylate-maleic anhydride block (B).

Preparation Example 3

(Preparation of Water Dispersion No. 1 corresponding to Water Dispersion ($A_1$))

A 0.5 L autoclave equipped with a stirrer was charged with 35 g of the block copolymer No. 1 obtained in Preparation Example 1 and 100 ml of water, followed by stirring at 60° C., feeding 15 ml of 10% aqueous sodium hydroxide solution over one hour by use of a gear pump, stirring for 30 minutes, and cooling down to room temperature to obtain a water dispersion No. 1 having a mean particle size of 0.39 μm.

Preparation Example 4

(Preparation of Water Dispersion No. 2 Corresponding to Water Dispersion ($A_1$))

A 0.5 L autoclave equipped with a stirrer was charged with 35 g of the block copolymer No. 2 obtained in Preparation Example 2 and 100 ml of water, followed by stirring at 60° C., feeding 15 ml of 10% aqueous sodium hydroxide solution over one hour by use of a gear pump, stirring for 30 minutes, and cooling down to room temperature to obtain a water dispersion No. 2 having a mean particle size of 0.36 μm.

Preparation Example 5

Preparation of Water Dispersion No. 3 Corresponding to Water Dispersion ($D_1$))

(1) Preparation of Olefin Emulsion:

A pressurized kneader was charged with 100 parts of ethylene·1-butene copolymer as an olefin polymer, 10 parts of maleic anhydride graft polyethylene to act as a dispersant by a basic substance and 5 parts of oleic acid, followed by kneading at 140° C. for 30 minutes, charging under pressure in five minutes 20 parts of an alkali water prepared by dissolving potassium hydroxide as a basic substance in an amount necessary to neutralize a total carboxylic acid in the maleic anhydride graft polyethylene and oleic acid by use of a pump connected with the kneader, keeping kneading for 30 minutes after the pressure of the kneader reached 3 kg/cm$^2$G, cooling the kneader down to 60° C. to taking out a resulting product as a white solid, mixing 10 parts of the white solid with 20 parts of water, stirring with a turbine impeller miner, filtering through a 100 mesh metal gauze with no residue to obtain an olefin emulsion having a solid content of 50%.

(2) Polymerization of Vinyl Monomer:

Next, a reactor was charged with 140 parts of the olefin emulsion and 152 parts of deionized water, followed by heating up to 80° C. under nitrogen atmosphere.

Separately, a mixture of 12 parts of styrene, 15 parts of 2-ethylhexyl acrylate and 0.3 part of benzoyl peroxide was added to 12 parts of deionized water and emulsified by use of 0.12 part of sodium dodecylbenzene sulfonate to obtain an emulsified mixture, followed by dropping the emulsified mixture into the above reactor containing the olefin emulsion over 3 hours, and keeping at that temperature for 4 hours to complete polymerization and to obtain water dispersion No. 3 having a solid content of 30%.

Preparation Example 6

Preparation of Water Dispersion No. 4 Corresponding to Water Dispersion (D₁))

(1) A reactor was charged with 100 parts of the olefin emulsion obtained in Preparation Example 5(1) and 165 parts of deionized water, followed by heating up to 80° C. under nitrogen atmosphere.

(2) Polymerization of Vinyl Monomer:

Separately, a mixture of 25 parts of styrene, 25 parts of 2-ethylhexyl acrylate and 0.5 part of benzoyl peroxide was added to 20 parts of deionized water and emulsified by use of 0.2 part of sodium dodecylbenzene sulfonate to obtain an emulsified mixture, followed by dropping the emulsified mixture into the above reactor containing the olefin emulsion over 3 hours, and keeping at that temperature for 4 hours to complete polymerization and to obtain water dispersion No. 4 having a solid content of 30%.

Preparation Example 7

Preparation of Polyester Resin No. 1

A four-necked flask equipped with a heater, stirrer, thermometer, reflux condenser and water separator was charged with 61.9 parts of 1,4-cyclohexane dicarboxylic acid, 70.1 parts of adipic acid, 62.8 parts of trimethylolpropane, 24.2 parts of neopentyl glycol and 44.6 parts of 1,4-cyclohexane dimethanol, followed by heating the resulting content from 160° C. to 230° C. over 3 hours, keeping at 230° C. for one hour, distilling off a formed condensation water by use of a fractionating column, adding 15.0 parts of anhydrous trimellitic acid and 0.5 part of dibutyltindilaurate to the resulting product, desolvating, neutralizing with dimethylethanolamine, and mixing with water to obtain polyester resin No. 1 having a solid content of 40%, hydroxyl value of 150 mgKOH/g, acid value of 35 mgKOH/g and a number average molecular weight of 2,000.

Preparation Example 8

Preparation of Polyester Resin No. 2

A four-necked flask equipped with a heater, stirrer, thermometer, reflux condenser and water separator was charged with 66 parts of 1,4-cyclohexane dicarboxylic acid, 74 parts of adipic acid, 65 parts of trimethylolpropane, and 74 parts of 1,4-cyclohexane dimethanol, followed by heating the resulting content from 160° C. to 230° C. over 3 hours, keeping at 230° C. for one hour, distilling off a formed condensation water by use of a fractionating column, and adding 0.5 part of dibutyltindilaurate to the resulting product, desolvating, neutralizing with dimethylethanolamine, and mixing with water to obtain polyester resin No. 2 having a solid content of 40%, hydroxyl value of 168 mgKOH/g, acid value of 25 mgKOH/g and a number average molecular weight of 2,000.

Preparation Example 9

Preparation of Polyester Resin No. 3

A four-necked flask equipped with a heater, stirrer, thermometer, reflux condenser and water separator was charged with 43.3 parts of adipic acid, 77.0 parts of isophthalic acid, 54.6 parts of trimethylolpropane, 64.0 parts of 2-butyl-2-ethylpropanediol and 21.0 parts of neopentyl glycol, followed by reacting to obtain a reaction product, adding 15.3 parts of anhydrous trimellitic acid and 0.5 part of dibutyltindilaurate to the resulting product, desolvating, neutralizing with dimethylethanolamine, and mixing with water to obtain polyester resin No. 3 having a solid content of 40%, hydroxyl value of 140 mgKOH/g, acid value of 35 mgKOH/g and a number average molecular weight of 2,000.

Respective monomer compositions and contents of alicyclic polybasic acid and alicyclic polyhydric alcohol of polyester resins No. 1 to No. 3 are shown in the following Table 1.

TABLE 1

|  | Preparation Example 7 | Preparation Example 8 | Preparation Example 9 |
|---|---|---|---|
| Polyester Resin | No. 1 | No. 2 | No. 3 |
| 1,4-cyclohexane dicarboxylic acid | 61.9 | 66.0 |  |
| Adipic acid | 70.1 | 74.0 | 43.8 |
| Isophthalic acid |  |  | 77.0 |
| Trimethylol propane | 62.8 | 65.0 | 54.6 |
| 2-butyl-2-ethylpropanediol |  |  | 64.0 |
| Neopentyl glycol | 24.2 |  | 21.0 |
| 1,4-cyclohexane dimethanol | 44.6 | 74.0 |  |
| Anhydrous trimellitic acid | 15.0 |  | 15.3 |
| Dibutyltin dilaurate | 0.5 | 0.5 | 0.5 |
| Content (%) of alicyclic polybasic acid and alicyclic polyhydric alcohol | 38.2 | 50 | 0 |

Preparation Example 10

Preparation Example of Acrylic Resin:

A reactor equipped with a thermometer, temperature controller, stirrer, reflux condenser and dropping device was charged with 300 parts of deionized water and 4.8 parts of 25% Reasope SE-1025 (surface active agent, trade name, marketed by Asahi Denka Co., Ltd.), followed by mixing with agitation under nitrogen stream, heating up to 82° C., adding 3%1 by part or 28.3 parts of the following monomer emulsion (1) and 60 parts of 1% sodium persulfate aqueous solution, keeping at 82° C. for 20 minutes, dropping a mixture prepared by mixing 120 parts of the 1% sodium persulfate aqueous solution and the balance of the monomer emulsion (1) into the reactor by use of a metering pump over 4 hours, aging for 2 hours, adding 282 parts of 1% dimethylethanolamine aqueous solution, keeping at 82° C. for 30 minutes, cooling down to 30° C., filtering with a 200 mesh nylon cloth and separating to obtain an aqueous acrylic resin solution having a solid content of 40.0%, a pH of 6.5 and a mean particle size of 0.15 μm.

| Composition of monomer emulsion (1): | |
|---|---|
| deionized water | 300 parts |
| 25% SE-1025 | 43.2 parts |
| styrene | 180 parts |
| n-butyl acrylate | 336 parts |
| 2-hydroxyethyl acrylate | 60 parts |
| acrylic resin | 24 parts |

Preparation Example 11

Preparation Example of Curing Agent No. 1:

The following composition containing components (1) to (6) was used to obtain the curing agent No. 1 as follows.

| Composition: | | % by weight |
|---|---|---|
| (1) | 1,6-hexamethylene diisocyanate trimer | 30 |
| (2) | polyoxyalkyleneamine (Jeffermine M-1000, trade name, marketed by Huntsman Chemical Co., Ltd.) | 3 |
| (3) | 3,5-dimethylpyrazole (blocking agent) | 16 |
| (4) | ethylene glycol monobutyl ether (solvent) | 7 |
| (5) | sodium sulfosuccinate | 4 |
| (6) | water | 40 |

A reactor was charged with component (1), followed by slowly adding component (2), heating up to 60 to 70° C. so that an isocyanate content may reach 20 to 21 mol %, keeping at 60 to 70° C. until the isocyanate content reaches zero, while slowly adding component (3), adding components (4) and (5), mixing for 5 minutes, adding component (6) water, and forming a dispersion by use of a high speed mixer.

Jeffermine M-1000 is an active hydrogen-containing compound which reacts with HMDI (1,6-hexamethylene diisocyanate) trimer to form a polyisocyanate prepolymer. The sodium sulfosuccinate is an ionic surface active agent which assists controlling a particle size of the dispersion.

Example 1

(Preparation of Water Based Coating Composition No. 1)

A mixture of 5 parts of water dispersion No. 1, 45 parts of polyester resin No. 1 (solid content), 55 parts (solid content) of curing agent No. 1, 80 parts of JR-806 (Note 4) and 10 parts of MICRO ACE S-3 (Note 5) was dispersed, followed by adding deionized water and controlling viscosity at Ford cup No. 4 20° C. 40 sec. to obtain water based coating composition No. 1 of Example 1.

Examples 2-6

Example 1 was duplicated except that formulations shown in Table 2 were used respectively to obtain water based coating compositions No. 2 to No. 6 respectively. In Table 2, formulations are represented by part by weight of solid content.

TABLE 2

| | | Examples | | | | | |
|---|---|---|---|---|---|---|---|
| | | 1 | 2 | 3 | 4 | 5 | 6 |
| | Water based coating composition | 1 | 2 | 3 | 4 | 5 | 6 |
| Water dispersion (A₁) | Water dispersion No. 1 | 5 | | 5 | | 5 | |
| | Water dispersion No. 2 | | 5 | | 5 | | 5 |
| Water dispersion (D₁) | Water dispersion No. 3 | | | 20 | | | |
| | Water dispersion No. 4 | | | | 20 | | |
| Urethane emulsion (E) | U coat UX8100 (Note 1) | | | | | 20 | |
| Hydroxyl group-containing resin (B) | Polyester resin No. 1 | 45 | | 45 | | 45 | 20 |
| | Polyester resin No. 2 | | 45 | | 45 | | |
| | Polyester resin No. 3 | | | | | | |
| | Acrylic resin | | | | | | 25 |
| Curing agent (C) | Curing agent No. 1 | 55 | 45 | 55 | 45 | 55 | 55 |
| | Cymel 325 (Note 3) | | 10 | | 10 | | |
| Color pigment | JR806 (Note 4) | 80 | 80 | 80 | 80 | 80 | 80 |
| | MICRO ACE S-3 (Note 5) | 10 | 10 | 10 | 10 | 10 | 10 |
| Water based coating composition coating film | L* value (Note 6) heat curing 150° C.-30 min. | 86 | 86 | 86 | 86 | 86 | 86 |
| | b* value (Note 7) heat curing 150° C.-30 min. | 1.2 | 1.2 | 1.4 | 1.4 | 1.3 | 1.4 |
| | Yellowing resistance A (Note 8) | 0.1 | 0.1 | 0.3 | 0.3 | 0.2 | 0.3 |
| | Yellowing resistance B (Note 9) | 0.1 | 0.1 | 0.3 | 0.3 | 0.3 | 0.3 |
| Multi-layer coating film | L* value (Note 6) heat curing 140° C.-30 min. | 81 | 81 | 81 | 81 | 81 | 81 |
| | b* value (Note 7) heat curing 140° C.-30 min. | 3.2 | 3.2 | 3.5 | 3.4 | 3.3 | 3.4 |
| | Yellowing resistance C (Note 10) | 0.6 | 0.6 | 0.9 | 0.7 | 0.7 | 0.8 |
| | Yellowing resistance D (Note 11) | 0.8 | 0.8 | 0.9 | 0.9 | 0.9 | 0.8 |
| | Water resistance (Note 12) | ○ | ○ | ○ | ○ | ○ | ○ |
| | Anti-chipping properties (Note 13) | ○ | ○ | ◉ | ◉ | ◉ | ○ |

Comparative Examples 1-3

Example 1 was duplicated except that respective water based coating compositions No. 7 to No. 9 of Comparative Examples 1 to 3 were obtained according to the formulations shown in Table 3, in which the formulations are represented by part by weight of the solid content.

TABLE 3

|  |  | Comparative Examples | | |
|---|---|---|---|---|
|  |  | 1 | 2 | 3 |
| Water based coating composition | | 7 | 8 | 9 |
| Water dispersion (A₁) | Water dispersion No. 1 | 5 | | |
|  | Water dispersion No. 2 | | | |
| Water dispersion (D₁) | Water dispersion No. 3 | | | |
|  | Water dispersion No. 4 | | | |
| Urethane emulsion (E) | U coat UX8100 (Note 1) | | | |
| Hydroxyl group-containing resin (B) | Polyester resin No. 1 | 45 | | |
|  | Polyester resin No. 2 | | | |
|  | Polyester resin No. 3 | | 45 | 45 |
|  | Acrylic resin | | | |
| Curing agent (C) | Curing agent No. 1 | | | |
|  | Bayhydrol VP LS2310 (Note 2) | 55 | 55 | 35 |
|  | Cymel 325 (Note 3) | | | 20 |
| Color pigment | JR806 (Note 4) | 80 | 80 | 80 |
|  | MICRO ACE S-3 (Note 5) | 10 | 10 | 10 |
| Water based coating composition coating film | L* value (Note 6) heat curing 150° C.-30 min. | 86 | 84 | 86 |
|  | b* value (Note 7) heat curing 150° C.-30 min. | 1.5 | 1.4 | 1.5 |
|  | Yellowing resistance A (Note 8) | 0.6 | 0.7 | 0.8 |
|  | Yellowing resistance B (Note 9) | 0.7 | 1.1 | 1.1 |
| Multi-layer coating film | L* value (Note 6) heat curing 140° C.-30 min. | 81 | 78 | 81 |
|  | b* value (Note 7) heat curing 140° C.-30 min. | 3.6 | 3.6 | 3.2 |
|  | Yellowing resistance C (Note 10) | 1.5 | 1.2 | 1.6 |
|  | Yellowing resistance D (Note 11) | 1.8 | 1.4 | 2 |
|  | Water resistance (Note 12) | ○ | ○ | ○ |
|  | Anti-chipping properties (Note 13) | ○ | Δ | X |

Preparation of test panel:

Elecron GT-10 (trade name; marketed by Kansai Paint Co., Ltd., cationic electrodeposition coating composition) was coated onto a cold-rolled steel sheet treated with Palbond #3020 (trade name, marketed by Nippon Parkerizing Co., Ltd., zinc phosphate treatment) by electrodeposition coating to obtain a test panel having a dry electrodeposition coating film of 20 μm.

Water Based Coating Composition Coating Film:

Water based coating compositions No. 1 to No. 9 prepared in Examples and Comparative Examples were coated onto the electrodeposition coating film to be a coating film thickness of 30 μm, followed by heat curing at 150° C. for 30 minutes to obtain water based coating composition coating films.

Multi-Layer Coating Film:

Magicron TB-516 Mica Base (trade name, marketed by Kansai Paint Co., Ltd., topcoat coating composition) was coated onto the water based coating composition coating-film to be a coating film thickness of 15 μm, followed by leaving to stand for 3 minutes at room temperature to form an uncured coating film, coating Magicron KINO 1200 Clear (trade name, marketed by Kansai Paint Co., Ltd.) onto the uncured coating film to form an uncured coating film to be a dry film thickness of 35 μm, and heat curing both uncured coating films simultaneously at 140° C. for 30 minutes to obtain a multi-layer coating film.

The above test panel was subjected to following evaluation test, and results are shown in Tables 2 and 3.

Test methods are as follows.

(Note 1) U Coat UX-8100: trade name, marketed by Sanyo Chemical Industries, Ltd., urethane emulsion.

(note 2) Bayhydrol VP LS2310: trade name, marketed by Sumika Bayel Urethane Co., Ltd., blocked polyisocyanate.

(Note 3) Cymel 325: trade name, marketed by Mitsui Cytec Ltd., imino group-containing melamine resin.

(Note 4) JR 806: trade name, marketed by Tayka Corporation, titanium white.

(Note 5) MICRO ACE S-3: trade name, marketed by Nippon Talc Co., Ltd., talc.

(Note 6) L value: Measured by Color-view Spectrophotometer (marketed by BYK-Gardner Co., Ltd.).

(Note 7) b* value: Measured by Color-view Spectrophotometer (marketed by BYK-Gardner Co., Ltd.).

(Note 8) Yellowing resistance A: Evaluation was made by a b* value difference ($\Delta b^*$) between a b* value under a heat curing condition of 160° C. and 30 minutes and a b* value under a standard heat curing condition of 150° C. for 30 minutes for the water based coating composition coating film.

good: $\Delta b^* < 0.5$; slightly poor: $0.5 \leq \Delta b^* \leq 0.6$; seriously poor: $1.0 < \Delta b^*$.

(Note 9) Yellowing resistance B: Evaluation was made by a b* value difference ($\Delta b^*$) between a b* value under an overbaking condition of 160° C. and 60 minutes and the b* value under the standard heat curing condition of 150° C. and 30 minutes for the water based coating composition coating film.

good: $\Delta b^* < 0.5$; slightly poor: $0.5 \leq \Delta b^* \leq 0.6$; seriously poor: $1.0 < \Delta b^*$.

(Note 10) Yellowing resistance C: Evaluation was made by a b* value difference ($\Delta b^*$) between a b value under a heat curing condition of 160° C. and 30 minutes and a b* value under a standard heat curing condition of 140° C. and 30 minutes for the topcoat coating film.

good: $\Delta b^* < 0.9$; slightly poor: $0.9 \leq \Delta b^* \leq 1.0$; seriously poor: $1.0 < \Delta b^*$.

(Note 11) Yellowing resistance D: Evaluation was made by a b* value difference ($\Delta b^*$) between a b* value under a heat curing condition of 160° C. and 60 minutes and the b* value under the standard heat curing condition of 140° C. and 30 minutes for the topcoat coating film.

good: $\Delta b^* < 0.9$; slightly poor: $0.9 \leq \Delta b^* \leq 1.0$; seriously poor: $1.0 < \Delta b^*$.

(Note 12) Water resistance: A test panel was dipped into a hot water at 40° C. for 10 days, followed by visually examining the conditions of the surface of the coating film as follows.

○: No blisters developed,

Δ: Slight blisters developed,

X: Many blisters developed.

(Note 13) Anti-chipping properties: A test panel was mounted on a test panel holder of a JA-400 type rebounding gravels test instrument marketed by Saga test instruments Co., Ltd. (chipping test apparatus), followed by spraying 50 g of granite gravels having a particle size of No. 7 onto the surface of a coating film under an air pressure of 0.392 MPa (4 kgf/cm$^2$) at −20° C., and visually evaluating degree of development of mars on the coating film as follows.

◎: Size of the mar is considerably small and the intercoat coating film is slightly exposed, ○: Size of the mar is small and the intercoat coating film is exposed, Δ: size of the mar is small, but steel sheet substrate is exposed, X: size of the mar is considerably large, and the steel sheet substrate is largely exposed.

What is claimed is:

1. An automobile body-used light-colored water based coating composition essentially consisting of a water dispersion ($A_1$) prepared by water-dispersing a block copolymer resin (A) comprising a block ($a_1$) obtained by polymerizing a monomer component containing an olefin monomer and a block ($a_2$) obtained by polymerizing a monomer component containing a carboxyl group-containing or carboxylic anhydride group-containing vinyl monomer, a hydroxyl group-containing resin (B), a curing agent (C), a water dispersion ($D_1$) prepared by water-dispersing a resin particle (D) containing in the same particle a copolymer of an olefin monomer and a copolymer of a vinyl monomer or an urethane emulsion (E), and a color pigment, the hydroxyl group-containing resin (B) being a polyester resin containing as essential components an alicyclic polybasic acid and an alicyclic polyhydric alcohol, a content of the alicyclic polybasic acid and the alicyclic polyhydric alcohol being in the range of 20 to 70 percent by weight based on a total solid content of monomers constituting the polyester resin, the curing agent (C) including a blocked polyisocyanate curing agent blocked with a pyrazole compound consisting of 3,5-dimethylpyrazole, a resulting coating film having a lightness L* value in accordance with a L*a*b* color system as defined in JIS Z 9729 in the range of 80 or more, and showing excellent anti-chipping properties.

2. The automobile body-used light-colored water based coating composition as claimed in claim 1, the water dispersion ($A_1$) is contained in the range of 0.1 to 30 parts by weight as solid content per 100 parts by weight of a total solid content of the hydroxyl group-containing resin (B) and the curing agent (C).

3. The automobile body-used light-colored water based coating composition as claimed in claim 1, wherein the water dispersion ($D_1$) prepared by water-dispersing a resin particle (D) containing in the same particle a copolymer of an olefin monomer and a copolymer of a vinyl monomer is contained in the range of 30 parts by weight or less as solid content per 100 parts by weight of a total solid content of the hydroxyl group-containing resin (B) and the curing agent (C).

4. The automobile body-used light-colored water based coating composition as claimed in claim 2, wherein the water dispersion ($D_1$) prepared by water-dispersing a resin particle (D) containing in the same particle a copolymer of an olefin monomer and a copolymer of a vinyl monomer is contained in the range of 30 parts by weight or less as solid content per 100 parts by weight of a total solid content of the hydroxyl group-containing resin (B) and the curing agent (C).

5. The automobile body-used light-colored water based coating composition as claimed in claim 1, wherein the urethane emulsion (E) is contained in the range of 1 to 30 parts by weight as solid content per 100 parts by weight of a total solid content of the hydroxyl group-containing resin (B) and the curing agent (C).

6. The automobile body-used light-colored water based coating composition as claimed in claim 2, wherein the urethane emulsion (E) is contained in the range of 1 to 30 parts by weight as solid content per 100 parts by weight of a total solid content of the hydroxyl group-containing resin (B) and the curing agent (C).

7. The automobile body-used light-colored water based coating composition as claimed in claim 3, wherein the urethane emulsion (E) is contained in the range of 1 to 30 parts by weight as solid content per 100 parts by weight of a total solid content of the hydroxyl group-containing resin (B) and the curing agent (C).

8. The automobile body-used light-colored water based coating composition as claimed in claim 1, wherein the coating composition further contains talc.

9. A multi-layer coating film-forming method which comprises successive steps (1) to (3):

step (1) of coating an automobile body-used light-colored water based coating composition as claimed in claim 1, onto a metal coating substrate or an electrodeposition coating-treated coating substrate without coating an anti-chipping primer to form an uncured coating film or to form a cured coating film by heat curing and drying, step (2) of coating a topcoat coating composition by at least one layer onto the coating film formed in step (1) to form an uncured topcoat coating film, and step (3) of heat curing and drying a multi-layer coating film formed in steps (1) and (2).

10. A multi-layer coating film-forming method as claimed in claim 9, wherein the coating substrate is an integral coating, substrate comprising an electrodeposition coating-treated metal member and a plastics member.

11. A multi-layer coating film-forming method which comprises successive steps (1) to (3):

step (1) of coating an automobile body-used light-colored water based coating composition as claimed in claim 2, onto a metal coating substrate or an electrodeposition coating-treated coating substrate without coating an anti-chipping primer to form an uncured coating film or to form a cured coating film by heat curing and drying, step (2) of coating a topcoat coating composition by at least one layer onto the coating film formed in step (1) to form an uncured topcoat coating film, and step (3) of heat curing and drying a multi-layer coating film formed in steps (1) and (2).

12. A multi-layer coating film-forming method which comprises successive steps (1) to (3):

step (1) of coating an automobile body-used light-colored water based coating composition as claimed in claim 3, onto a metal coating substrate or an electrodeposition coating-treated coating substrate without coating an anti-chipping primer to form an uncured coating film or to form a cured coating film by heat curing and drying, step (2) of coating a topcoat coating composition by at least one layer onto the coating film formed in step (1) to form an uncured topcoat coating film, and step (3) of heat curing and drying a multi-layer coating film formed in steps (1) and (2).

13. A multi-layer coating film-forming method which comprises successive steps (1) to (3):

step (1) of coating an automobile body-used light-colored water based coating composition as claimed in claim 5, onto a metal coating substrate or an electrodeposition coating-treated coating substrate without coating an anti-chipping primer to form an uncured coating film or to form a cured coating film by heat curing and drying, step (2) of coating a topcoat coating composition by at least one layer onto the coating film formed in step (1) to form an uncured topcoat coating film, and step (3) of heat curing and drying a multi-layer coating film formed in steps (1) and (2).

* * * * *